(12) United States Patent
Yamamoto

(10) Patent No.: US 8,269,996 B2
(45) Date of Patent: Sep. 18, 2012

(54) IMAGE FORMING APPARATUS AND CONTROL METHOD FOR CORRECTING THE OFFSET OF SCANNING LINES

(75) Inventor: Naohiro Yamamoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 631 days.

(21) Appl. No.: 12/361,383

(22) Filed: Jan. 28, 2009

(65) Prior Publication Data

US 2009/0190172 A1    Jul. 30, 2009

(30) Foreign Application Priority Data

Jan. 30, 2008   (JP) .................... 2008-019056

(51) Int. Cl.
*G06K 15/00* (2006.01)
*H04N 1/04* (2006.01)
*G02B 5/32* (2006.01)

(52) U.S. Cl. ...... 358/1.14; 358/1.1; 358/1.12; 358/1.15; 358/1.16; 358/1.9; 358/1.7; 358/3.03; 358/3.06; 358/296; 358/448; 358/474; 358/484; 358/498; 358/501; 358/504; 359/17; 359/196.1; 359/201.1; 359/202.1; 359/205.1; 347/224; 347/233; 347/235; 347/241; 347/247; 347/254; 347/256; 347/257; 347/263

(58) Field of Classification Search .................... None
See application file for complete search history.

(56) References Cited

U.S. PATENT DOCUMENTS

| | | | | |
|---|---|---|---|---|
| 5,659,669 A | * | 8/1997 | Narukawa et al. | 358/1.2 |
| 5,774,579 A | * | 6/1998 | Wang et al. | 382/176 |
| 7,777,923 B2 | * | 8/2010 | Kuribayashi | 358/484 |
| 2006/0098227 A1 | * | 5/2006 | Namizuka et al. | 358/1.16 |
| 2008/0088861 A1 | * | 4/2008 | Kondo | 358/1.9 |

FOREIGN PATENT DOCUMENTS

| | | | |
|---|---|---|---|
| JP | 2003-241131 A | | 8/2003 |
| JP | 2004-170755 | * | 6/2004 |
| JP | 2004-170755 A | | 6/2004 |

* cited by examiner

*Primary Examiner* — Steven Kau

(74) *Attorney, Agent, or Firm* — Carter, DeLuca, Farrell & Schmidt LLP

(57) ABSTRACT

An image forming apparatus switches a line of image data, to be read out from a storage unit, to another, depending on a position in the line in a scanning direction such that the curving of a scanning line is offset, and reducing trouble in reading out image data in units of rectangular image data blocks A data processing section performs image processing based on a plurality of rectangular image areas generated by dividing image data stored in a memory section. An image reading unit reads out the image data as the rectangular image areas, and transfers the rectangular image areas to the data processing section. A printer section forms an image by scanning a photosensitive member with irradiation light based on the rectangular image data areas. A DMA controller stores positional information indicative of line-switching positions. The rectangular image data areas are read out according to the positional information.

11 Claims, 14 Drawing Sheets

FIG.11
  remark pixel
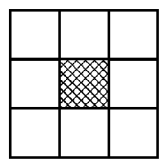  case : MK_AVE = 0
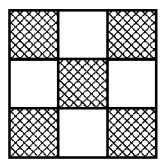  case : MK_AVE = 0.5
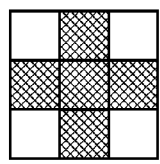  case : MK_AVE = 0.5
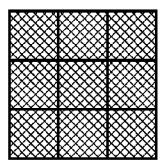  case : MK_AVE = 1.0

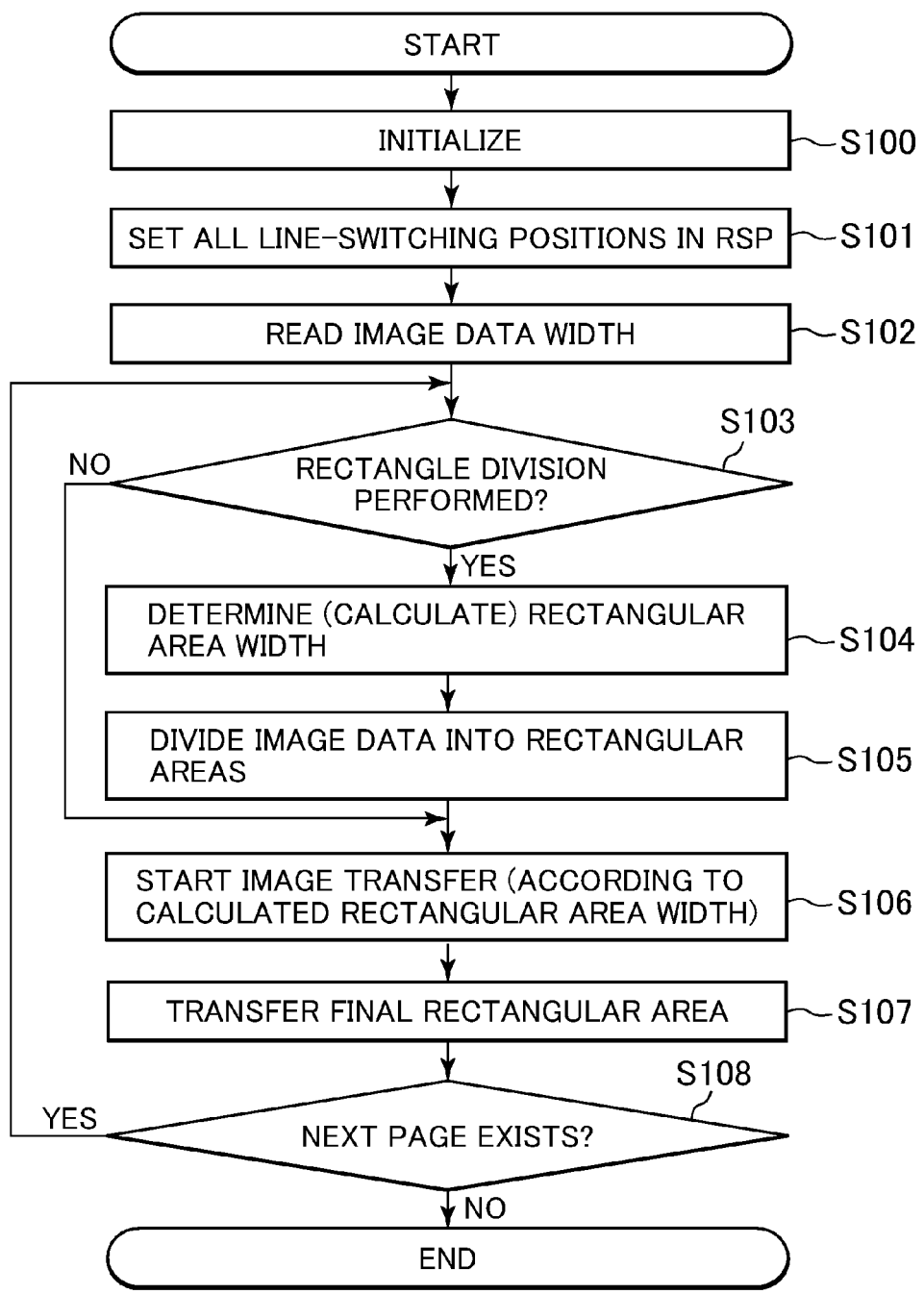

IMAGE FORMING APPARATUS AND CONTROL METHOD FOR CORRECTING THE OFFSET OF SCANNING LINES

BACKGROUND OF THE INVENTION

1. Field of the Invention

The present invention relates to an image forming apparatus and a control method therefor.

2. Description of the Related Art

Conventionally, there has been known an electrophotographic image forming apparatus. The electrophotographic image forming apparatus has a laser light source for scanning (irradiating) a photosensitive member, i.e. a photosensitive drum with a laser beam corresponding to image data, and an electrostatic charger for electrically charging the photosensitive drum. Further, the electrophotographic image forming apparatus is provided with a development device for toner-developing an electrostatic latent image formed on the photosensitive drum by irradiation of the electrically charged photosensitive drum with the laser beam. Furthermore, the electrophotographic image forming apparatus is provided with a transfer device for transferring a toner image, developed on the photosensitive drum by the development device, onto a sheet (recording sheet).

Ideally, in the above-mentioned electrophotographic image forming apparatus, when the photosensitive drum is scanned (irradiated) with a laser beam emitted based on one-line image data, a scanning line is formed into a straight line extending parallel with the axis of the photosensitive drum. However, due to mechanical error of the mounting position or the like of the laser light source or the photosensitive drum, a case can occur where the scanning line is not a straight line parallel with the scanning direction (i.e. the scanning line is curved). To correct such curving of the scanning line, there have been proposed techniques mentioned below.

A method has been proposed in which in a step of mounting an exposure unit into the body of an image forming apparatus, the degree of inclination of each scanning line is measured using an optical sensor and then the inclination of the scanning line is adjusted by mechanically tilting the exposure unit, whereafter the exposure unit is mounted into the body of the image forming apparatus (see Japanese Patent Laid-Open Publication (Kokai) No. 2003-241131).

Further, another method has been proposed in which the respective degrees of inclination and curving of a scanning line are measured using an optical sensor and then bitmap image data is corrected such that the inclination and curve of the scanning line are offset, whereafter an image is formed based on the corrected bitmap image data (see Japanese Patent Laid-Open Publication (Kokai) No. 2004-170755).

This method is an electrical method in which the scanning line curve is corrected by processing image data. Therefore, the method disclosed by Japanese Patent Laid-Open Publication (Kokai) No. 2004-170755 dispenses with mechanical adjusting members and an adjusting step during assembly, and hence can cope the curving of the scanning line at lower costs than the method disclosed in Japanese Patent Laid-Open Publication (Kokai) No. 2003-241131.

In a case where image data obtained by reading an original by an image reader or the like is processed in an image processing section, the image processing section necessitates a buffer for temporarily storing the image data. To reduce the capacity of the buffer, a method has been proposed in which the image data is divided into a plurality of rectangular image data blocks, and the divided image data is read out from a memory in units of rectangular image data blocks. This method makes it unnecessary to provide the image processing section with a buffer which is capable of storing all pixels in a line direction of image data obtained by reading an original, and hence it is possible to reduce the capacity of the buffer.

However, if the image forming apparatus including the image processing section that processes image data by dividing the same into rectangular image data blocks is provided with the above-mentioned function for offsetting a scanning line curve, trouble can occur.

SUMMARY OF THE INVENTION

According to an aspect of the present invention, an image forming apparatus is capable of switching a line of image data, to be read out from a storage unit, to another, depending on a position in the line in a scanning direction such that the curving of a scanning line is offset, and reducing trouble in reading out image data in units of rectangular image data blocks, and a control method for the image forming apparatus.

According to another aspect of the present invention, an image forming apparatus comprises an image data storage unit adapted to store image data, an image processing unit adapted to carry out image processing based on a plurality of rectangular image data blocks generated by dividing image data stored in the image data storage unit, a transfer unit adapted to read out the image data stored in the image storage unit, as the rectangular image data blocks, and transfer the rectangular image data blocks to the image processing unit, an image forming unit adapted to form an image by scanning a photosensitive member with irradiation light based on each of the rectangular image data blocks subjected to image processing by the image processing unit, and a positional information storage unit adapted to store positional information indicative of positions in a direction of scanning with the irradiation light, for switching a line of image data, to be read out from the image data storage unit by the transfer unit, to another, so as to correct curving of a scanning line for scanning the photosensitive member with the irradiation light, wherein the transfer unit reads out the rectangular image data blocks such that the positions indicated by the positional information stored in the positional information storage unit correspond to boundary positions between the rectangular image data blocks.

According to another aspect of the present invention, there is provided a control method for an image forming apparatus including an image data storage section that stores image data, an image forming section that forms an image by scanning a photosensitive member with irradiation light based on the image data, and a positional information storage section that stores positional information indicative of positions in a direction of scanning with the irradiation light, for switching a line of image data, to be read out from the image data storage section, to another, so as to correct curving of a scanning line for scanning the photosensitive member with the irradiation light. The control method comprises reading out the image data stored in the image data storage section as a plurality of rectangular image data blocks and transferring the rectangular image data blocks to an image processing section, and carrying out image processing in the image processing section based on the rectangular image data blocks generated by dividing the image data in the image data storage section, wherein the transferring includes reading out the rectangular image data blocks such that the positions indicated by the positional information stored in the positional information storage section correspond to boundary positions between the rectangular image data blocks.

According to a feature of the present invention, it is possible to switch a line of image data, to be read out from a storage unit, to another, depending on a position in the line in a scanning direction such that the curving of a scanning line is offset, and to reduce trouble in reading out image data in units of rectangular image data blocks.

The aspects, features, and advantages of the invention will become more apparent from the following detailed description taken in conjunction with the accompanying drawings.

BRIEF DESCRIPTION OF THE DRAWINGS

FIG. 11 is a diagram useful in explaining processing for determining the pixel value of a remark pixel while referring to the pixel values of respective pixels around the remark pixel.

FIG. 14 is a flowchart of a rectangular area width-determining process.

DETAILED DESCRIPTION OF THE EMBODIMENTS

Various embodiments of the present invention are described in detail below with reference to the accompanying drawings.

Figure 1:
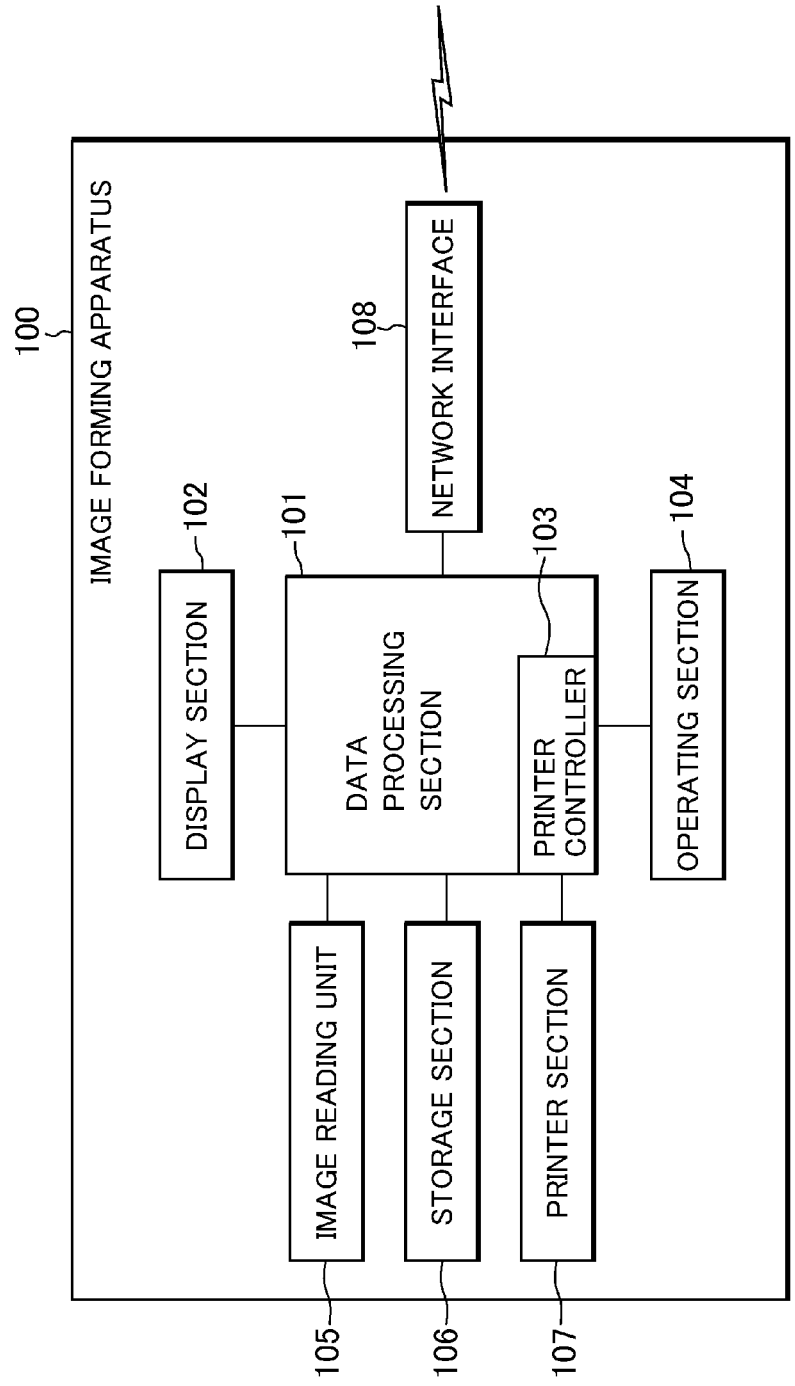
FIG. 1 is a schematic block diagram of an image forming apparatus according to a first embodiment of the present invention.

FIG. 1 is a schematic block diagram of an image forming apparatus according to a first embodiment of the present invention. The image forming apparatus 100 shown in FIG. 1 is implemented by an MFP (Multi-Function Peripheral) provided with a plurality of functions, such as a scanning function, a printing function, and a facsimile function. The image forming apparatus 100 is connected to a network via a network interface 108, and is capable of exchanging image data and apparatus information with another apparatus having a communication function, via the network.

Further, the image forming apparatus 100 (printer section 107) employs a tandem system for a color printing mechanism, and has four exposure and development stations (image forming section) associated with respective colors of C, M, Y, and K. Each of the exposure and development stations has a laser light source for scanning (irradiating) a photosensitive member, i.e. a photosensitive drum with a laser beam (irradiation light) corresponding to image data, and an electrostatic charger for electrically charging the photosensitive drum. Further, the exposure and development station is provided with a development device for toner-developing an electrostatic latent image formed on the photosensitive drum by irradiation of the charged photosensitive drum with the laser beam. Furthermore, the exposure and development station is provided with a transfer device for transferring a toner image, developed on the photosensitive drum by the development device, onto a sheet (recording sheet).

Referring to FIG. 1, an image reading unit 105 includes an original platen glass, not shown, and an automatic document feeder (ADF), not shown. The image reading unit 105 optically reads an image from an original fed to an original reading position by the ADF, and an optical image of the original thus read is caused to be formed by lenses on a solid-state image pickup element (not shown). The solid-state image pickup element photoelectrically converts the optical image into signals indicative of a raster analog image having a predetermined density (e.g. 600 DPI) to output the image signals. The image reading unit 105 can read recorded information (image) not only from a sheet original, but also from a transparent original, such as an OHP sheet or a film, and a recording medium formed of another material, such as cloth.

A data processing section 101 incorporates a control section implemented e.g. by a microcomputer, and controls the overall operation of the image forming apparatus 100. More specifically, the data processing section 101 forms image by performing analog-to-digital conversion of the analog image signals output from the image reading unit 105, and performs predetermined image processing on the image data to thereby form print data. Then, the data processing section 101 supplies the print data to a printer controller 103 or sends the same to an external apparatus via the network interface 108, according to an operation signal from an operating section 104.

Further, the data processing section 101 causes a display section 102 to display information indicative of the operational status of the operating section 104, currently processed image data, and so forth. The display section 102 has a touch screen, such as a liquid crystal touch panel, to provide a user interface for enabling the user to input various operational instructions.

When the number of copies to be printed is plural, the data processing section 101 stores print data in a storage section 106. The data processing section 101 also stores image data received from an external apparatus via the network interface 108 in the storage section 106.

The printer controller 103 controls the printing operation of the printer section 107 in response to an instruction from the data processing section 101. Although omitted from illustration, the control section of the data processing section 101 includes a CPU, a ROM, and a RAM, and controls the above-mentioned operations.

Figure 2:
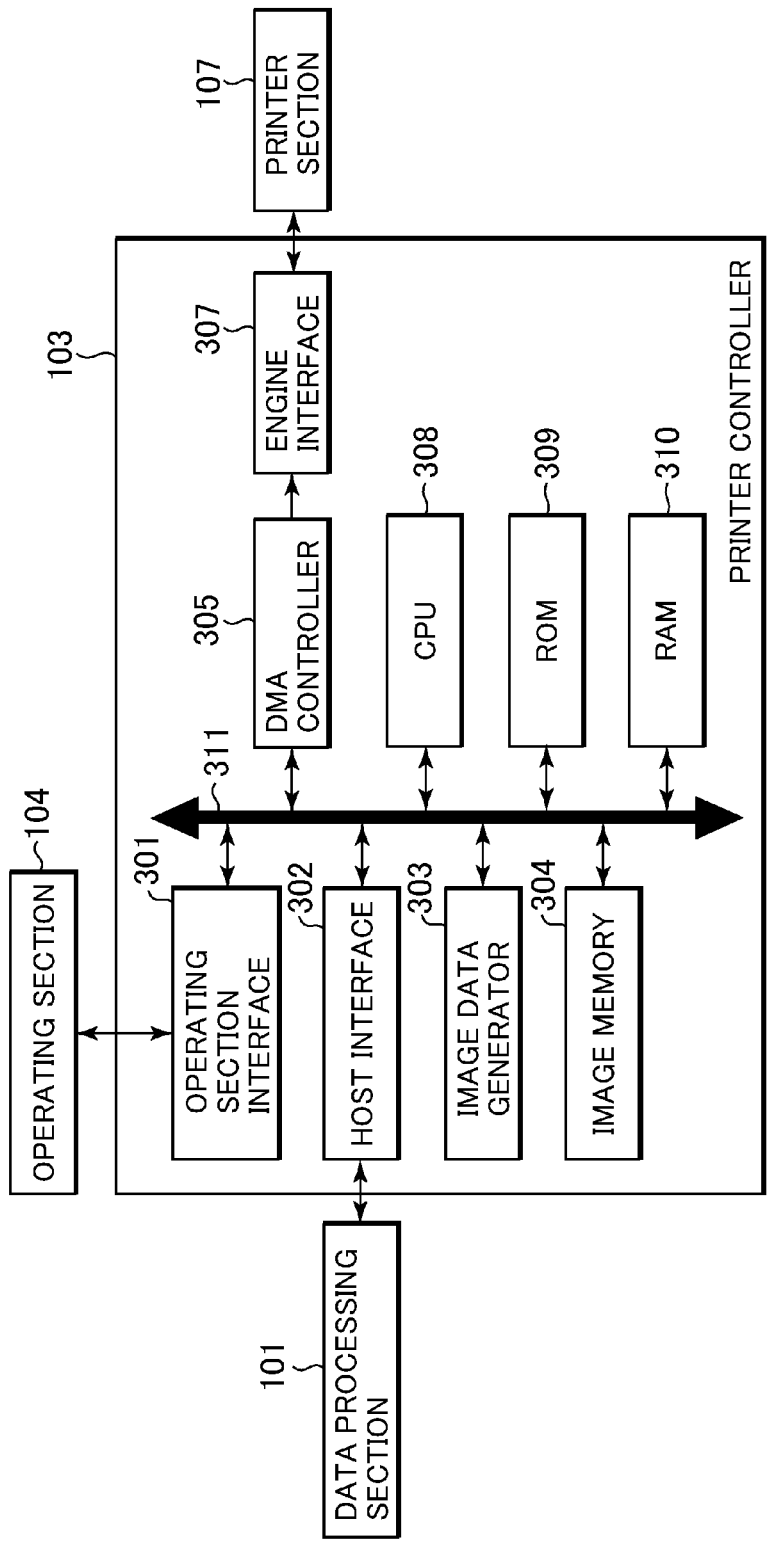
FIG. 2 is a block diagram of a printer controller incorporated in the image forming apparatus.

Next, a description will be given of the configuration of the printer controller 103. FIG. 2 is a block diagram of the printer controller 103.

As shown in FIG. 2, the printer controller 103 includes an operating section interface 301, a host interface 302, an image data generator 303, an image memory 304, a DMA (Direct Memory Access) controller 305, and an engine interface 307. Further, the printer controller 103 includes a CPU 308, a ROM 309, and a RAM 310. These blocks are interconnected via a system bus 311 so that data and commands can be exchanged. The system bus 311 is comprised of an address bus and a system bus.

Operational signals from the operating section 104, such as instruction signals concerning mode setting, are input to the printer controller 103 via the operating section interface 301. The host interface 302 is provided with an input buffer (not shown) into which print data delivered from the data processing section 101 and configuration information designating an operation of the printer section 107 are input.

On the other hand, the host interface 302 is provided with an output buffer for temporarily storing output data including signals to be delivered to the data processing section 101 and data of information on the printer section 107 and the printer controller 103. Further, the host interface 302 not only functions as an input-and-output section for transmitting and receiving signals and communication packets to and from the data processing section 101, but also controls communication with the data processing section 101.

Print data input via the host interface 302 is supplied to the image data generator 303 under the control of the CPU 308. Print data to be input is formed e.g. by PDL (Page Description Language) data. The image data generator 303 carries out analysis processing (e.g. PDL analysis processing) on the input print data, generates an intermediate language based on the result of the analysis, and further generates bitmap data that can be processed by the printer section (printer engine) 107.

At this time, the image data generator 303 performs rasterization processing in parallel with the processing for generating the intermediate language. In the rasterization processing, display colors R, G, and B (for additive color mixing) contained in the print data are converted into colors Y, M, C, and K (for subtractive color mixing) that can be processed by the printer section 107. Further, in the rasterization processing, character code contained in the print data is converted into font data, such as bit pattern data or outline font data, stored in the ROM 309 in advance.

Furthermore, in the rasterization processing, bitmap data is generated on a page-by-page basis or on a band-by-band basis, and pseudo gradation processing is performed on the bitmap data using a dither pattern, whereby bitmap data that can be processed by the printer section 107 is generated. This bitmap data is stored in the image memory 304. That is, the image memory 304 functions as an image data storage unit (image data storage section). Processing for reading out bitmap data from the image memory 304 and transferring the read-out bitmap data is controlled by the DMA controller 305 in response to an instruction from the CPU 308.

The bitmap data read out from the image memory 304 is transferred to the printer section 107 via the engine interface 307, as a video signal for printing, according to the width of a rectangular area calculated based on information indicative of a line-switching position, described hereinafter. The engine interface 307 is provided with an output buffer (not shown) for temporarily storing the video signal to be transferred to the printer section 107 and an input buffer (not shown) for temporarily storing a status signal and the like delivered from the printer section 107. Further, the engine interface 307 functions as an input-and-output section for inputting/outputting signals exchanged between the printer controller 103 and the printer section 107, as well as controls communication with the printer section 107.

The CPU 308 performs control of the above-described blocks based on control programs stored in the ROM 309 according to a mode designated by the operating section 104 and the data processing section 101. The control programs stored in the ROM 309 include an OS (operating system) for performing time-sharing control of each load module (called a task) using a system clock.

Further, the control programs include a plurality of load modules executed and controlled by the OS on a function-by-function basis. The load modules include one associated with a flowchart in FIG. 14. The data processing section 100, sub-data processing sections 1000, described hereinafter, and the DMA controller 305 also incorporate control programs for executing steps in the FIG. 14 flowchart.

The CPU 308 uses the RAM 310 as a work area etc. to execute a control program.

Figure 3:
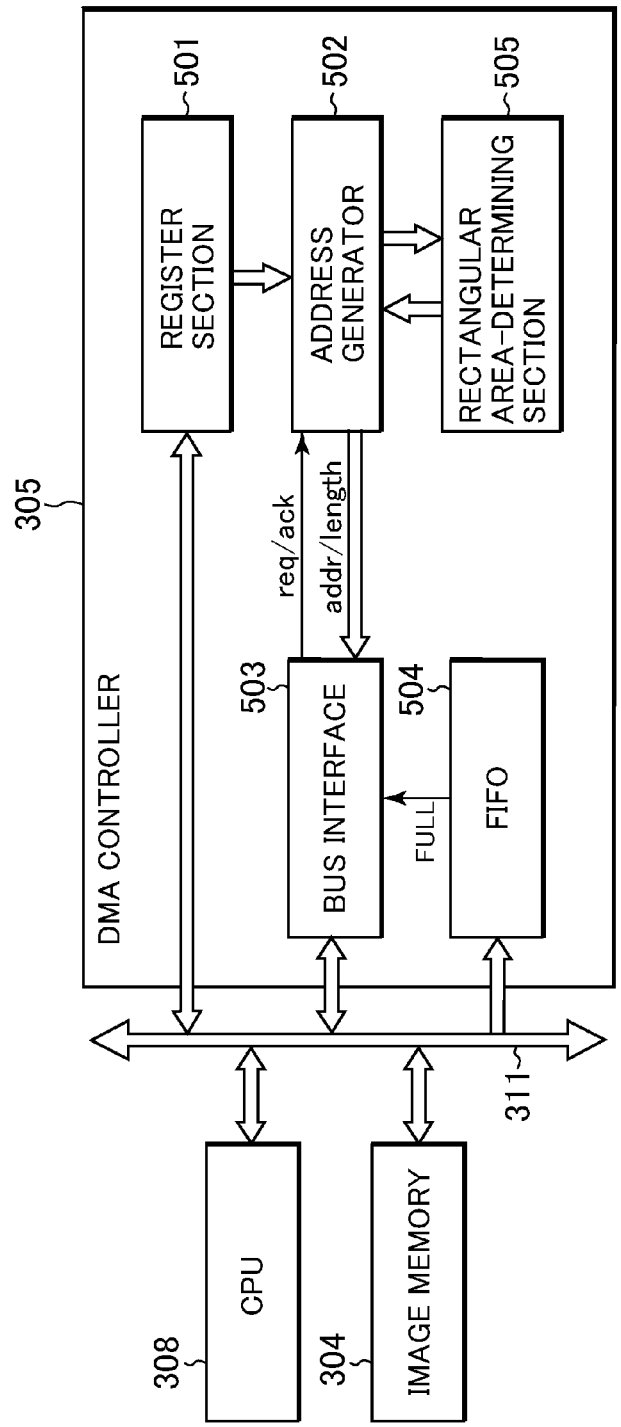
FIG. 3 is a block diagram of a DMA controller as a component of the printer controller.

Next, a description will be given of the configuration of the DMA controller 305. FIG. 3 is a block diagram of the DMA controller 305. As shown in FIG. 3, the DMA controller 305 is comprised of a register section 501, an address generator 502, a bus interface 503, a FIFO (First In First Out) section 504, and a rectangular area-determining section 505.

The register section 501 is comprised of a plurality of registers (not shown). The CPU 308 gives an instruction to the DMA controller 305 by writing appropriate signal values into the respective registers in the register section 501. The information indicative of a position for switching between image data read lines so as to offset the curving of a scanning line (hereinafter referred to as a line-switching position) is also written in the register section 501.

The address generator 502 generates an address, for reading out bitmap data stored in the image memory 304, by referring to values in the registers in the register section 501. The information for reference includes the information indicative of a line-switching position. More specifically, the registers in the register section 501 function as a positional information storage unit (positional information storage section) for storing positional information indicative of a position (position in a scanning direction of a laser beam) for switching a line of image data, to be read out from the image memory 304, to another.

The address generator 502 requests the bus interface 503, using a request signal ("req" in FIG. 3), to deliver an address signal ("addr" in FIG. 3) and a length signal ("length" in FIG. 3) indicative of the data length of data to be read out from the address.

The length signal is set to a value calculated based on information indicative of the line-switching position in consideration of an optimal rectangular area width for data transfer and processing of image data divided into rectangular areas.

Figure 5:
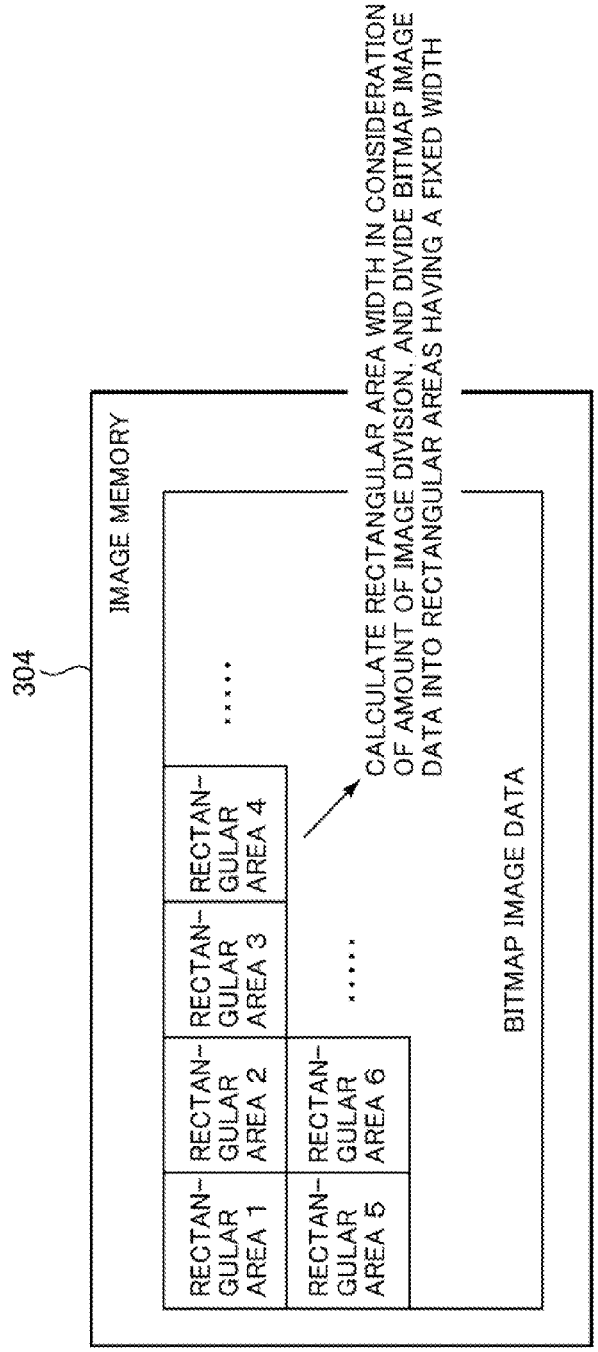
FIG. 5 is a diagram useful in explaining a method of dividing image data into rectangular areas.

The width of rectangular areas obtained by dividing the image data is determined by the rectangular area-determining section 505, based on the information indicative of the line-switching positions set in the register section 501, such that each rectangular area does not include a line-switching position and assumes a maximum rectangle width. It is desirable that the rectangular area width be fixed, as shown in FIG. 5.

For calculation of the rectangular area width, information of all line-switching positions on one scanning line is extracted. In the present embodiment, it is assumed that spacing intervals between a plurality of line-switching positions on each scanning line are set to at least several millimeters, as described hereinafter. Further, a plurality of line-switching positions on each scanning line are set uniquely for each image forming apparatus. For this reason, it is desirable that during manufacturing of the image forming apparatus 100, line-switching positions be calculated based on information detected by a device for detecting the curving of a scanning line, and information indicative of the calculated line-switching positions be written in the register section 501 as register information.

In the present embodiment, the line-switching positions are fixed without being changed depending on pages or jobs. Therefore, once the rectangular area width has been set to an optimal value, it is no longer required to change the value. Spacing between line-switching positions on one scanning line is set to at least several millimeters (see "Example: 300 pixels" and "Example: 1000 pixels" in FIG. 4, and blackened portions in FIG. 6B), and hence is far larger than spacing which is supposed to be set as a rectangular area width (corresponding to several tens to a hundred of pixels).

The address generator 502 extracts information of all line-switching positions on each scanning line and then calculates spacing between the line-switching positions. For example, let it be assumed that a 0-pixel position, a 300-pixel position, a 1000-pixel position, a 3000-pixel position, and a 4000-pixel position are line-switching positions (positions on one scanning line in the scanning direction). In this case, spacings between respective adjacent twos of the line-switching positions are 300 pixels, 700 pixels, 2000 pixels, and 1000 pixels.

Next, the address generator 502 calculates the greatest common divisor of the spacings between the respective adjacent twos of the line-switching positions. This greatest common divisor is a value of the maximum width that the rectangular area width can assume. In the above example, the greatest common divisor is equal to 100 pixels, and therefore the maximum value of the rectangular area width is calculated as 100 pixels.

The rectangular area-determining section 505 determines the maximum value of the rectangular area width calculated by the address generator 502 to be the rectangular area width. However, the rectangular area width cannot exceed the size of a reference memory 1002 (see FIG. 13) provided in each sub-data processing section 1000. Therefore, if the calculated maximum value of the rectangular area width exceeds the maximum value of the width of an area that can be storable in the reference memory 1002, the maximum value of the width of an area that can be stored in the reference memory 1002 is determined as the rectangular area width.

As described above, the rectangular area-determining section 505 determines the rectangular area width within a range up to the maximum rectangular area width value and within the size of the reference memory 1002.

The size of the reference memory 1002 and the unit of data transfer can be determined in advance for each image forming apparatus. Therefore, determination of the rectangular area width may be performed in a factory that manufactures the image forming apparatus 100, and the register section 501 may store information indicative of the determined rectangular area width. Line-switching positions are set in consideration of the main scanning direction (scanning direction) alone, and hence the vertical width of each rectangular area can be determined without regard to the line-switching positions.

Figure 4:
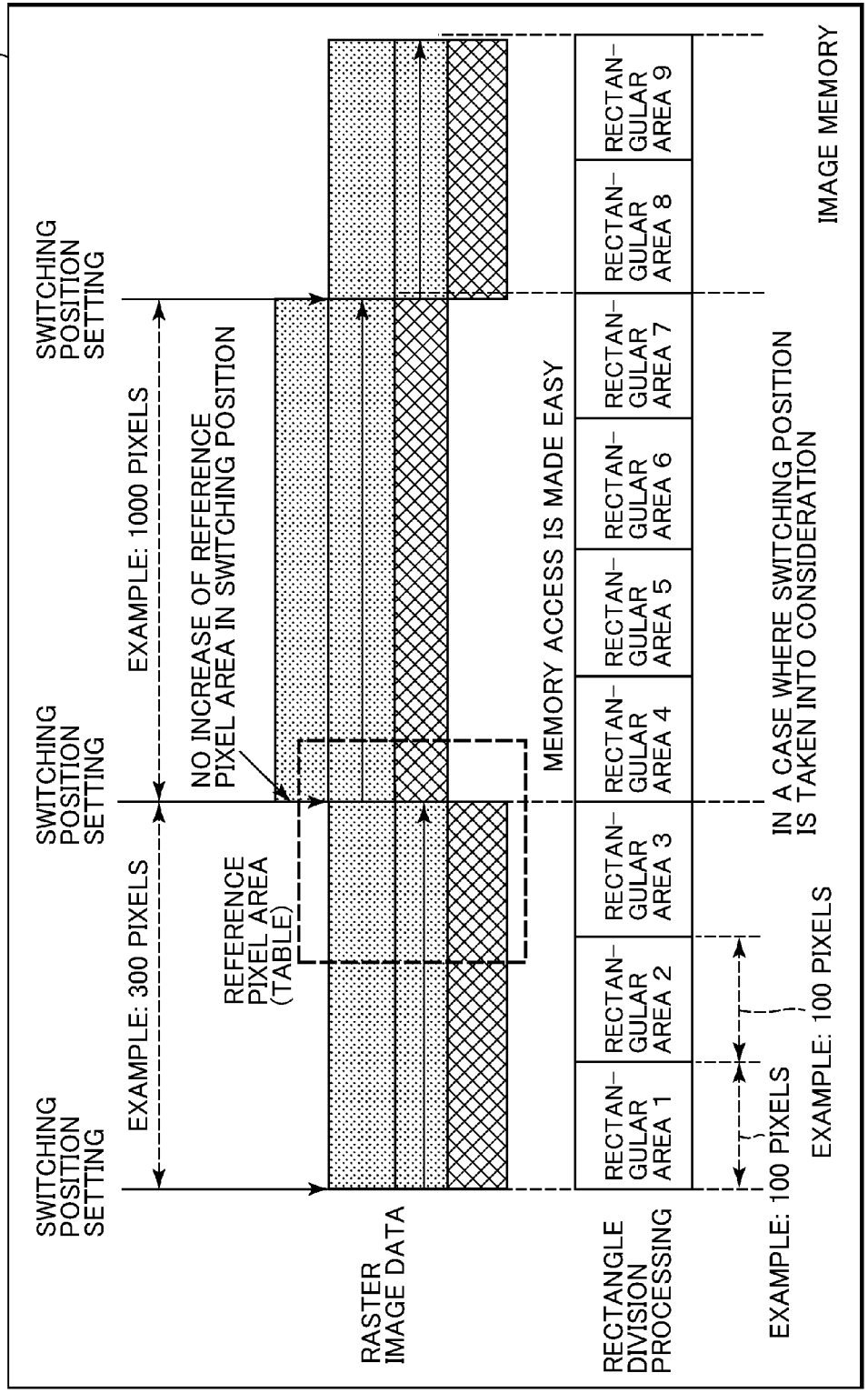
FIG. 4 is a diagram showing a case where each line-switching position is made coincident with a boundary between rectangle areas (according to the first embodiment).

FIG. 4 shows the relationship between the line-switching positions and the rectangular area width in the above case.

As shown in FIG. 4, bitmap data in the image memory 304 is divided into rectangular areas defined by the above-described rectangular area width, and the rectangular areas are handled as unit image data.

Upon reception of the address signal and the length signal from the address generator 502, the bus interface 503 appearing in FIG. 3 issues a read transaction to the system bus 311.

For example, if the data bus of the system bus 311 has a width of 32 bits, the bus interface 503 generates a plurality of 32-bit access signals based on the address signal and the length signal and issues the read transaction.

When processing on one pair of the address signal and the length signal is completed, the bus interface 503 notifies the address generator 502 of the completion of the processing, using a response signal ("ask" in FIG. 3). When receiving the response signal, the address generator 502 is allowed to request the bus interface 503 to process a next pair of an address signal and a length signal.

Bitmap data read out from the image memory 304 is temporarily stored in the FIFO 504. Even if a time period temporarily occurs during which data cannot be output to the engine interface 307 occurs, the DMA controller 305 stores bitmap data in the FIFO 504.

Next, the principles of correction of the curving of the scanning line will be described with reference to FIGS. 6A and 6B and FIGS. 7A and 7B. FIGS. 6A and 6B and FIGS. 7A and 7B are diagrams useful in explaining the principles of correction of the scanning line.

Figure 6:
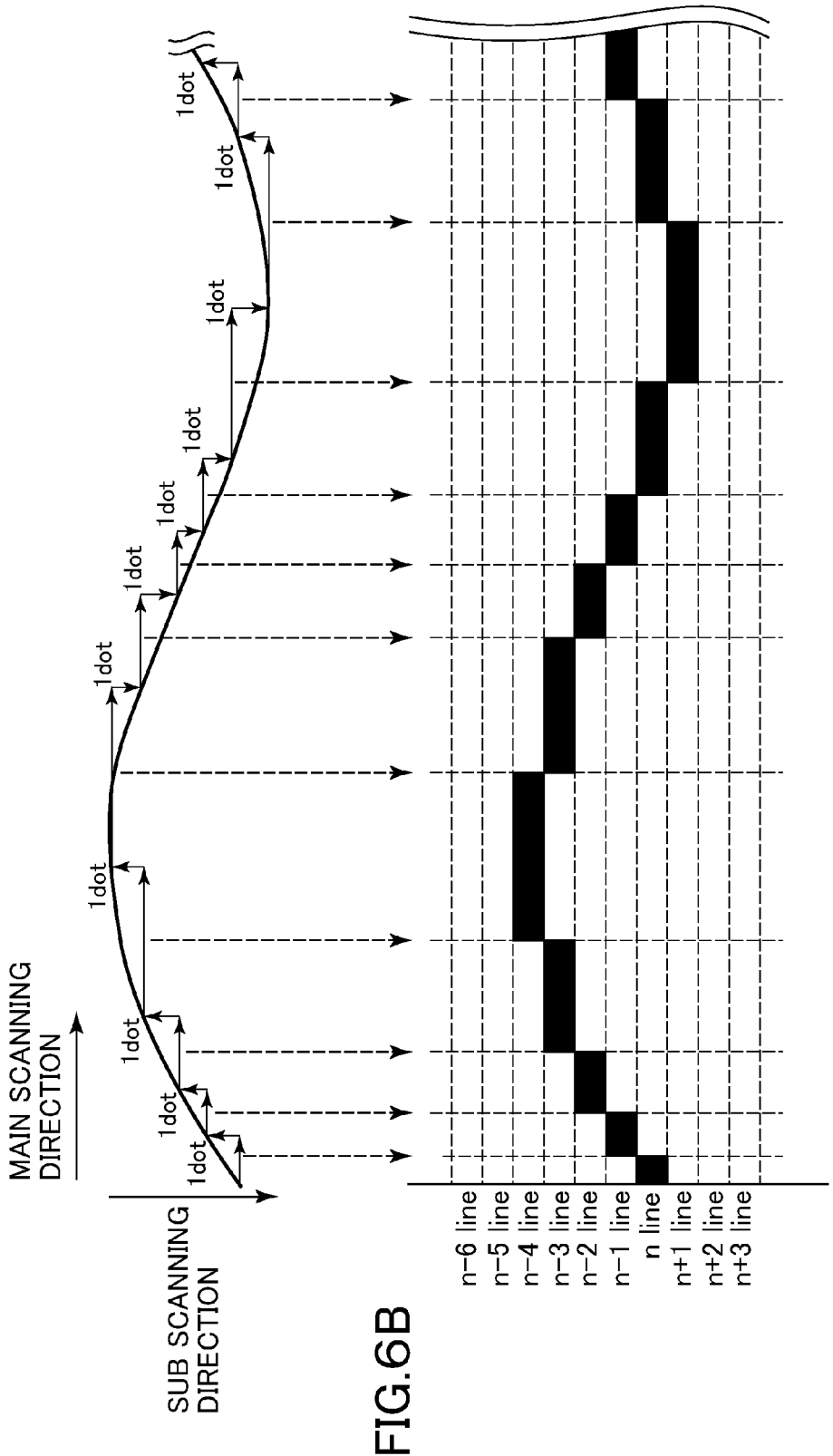
FIGS. 6A and 6B are diagrams showing how bitmap data is output to a printer section while switching one line to another according to the curving of a scanning line.

FIG. 6A shows a curved scanning line. FIG. 6B shows how bitmap data is delivered to the printer section 107 while performing line switching in accordance with the curving of the scanning line. Lines in FIG. 6B represent image data stored in the image memory 304, and each of the lines corresponds to one line of the image data read by the image reading unit 105 on a line-by-line basis. For example, ideally, when bitmap data of an n-th line in FIG. 6B is read out and supplied to the laser light source of the printer section 107 and then a photosensitive drum is exposed to a laser beam, the scanning line should be formed into a straight line extending parallel with the axial direction (main scanning direction in FIG. 6B) of the photosensitive drum. Actually, however, there occurs a case where the scanning line is not always formed into a straight line extending parallel with the main scanning direction (i.e. the scanning line is sometimes curved) due to an mechanical error in respect of the mounting position or the like of the laser light source or the photosensitive drum in the image forming apparatus 100. FIG. 6A shows a case where the scanning line is curved.

Referring to FIG. 6B, blackened portions indicate data delivered to the printer section 107 in accordance with one-time scanning of a scanning line. In the case of thus reading out bitmap data from the image memory 304 in accordance with a scanning line curve, the data is output to the printer section 107 while switching one line to be read out to another depending on the position in the main scanning direction (scanning direction of the laser beam). By doing this, an electrostatic latent image on the photosensitive drum (image bearing member) is formed as an uncurved straight line even if the exposure scanning is performed with a curved scanning line.

Figure 7:
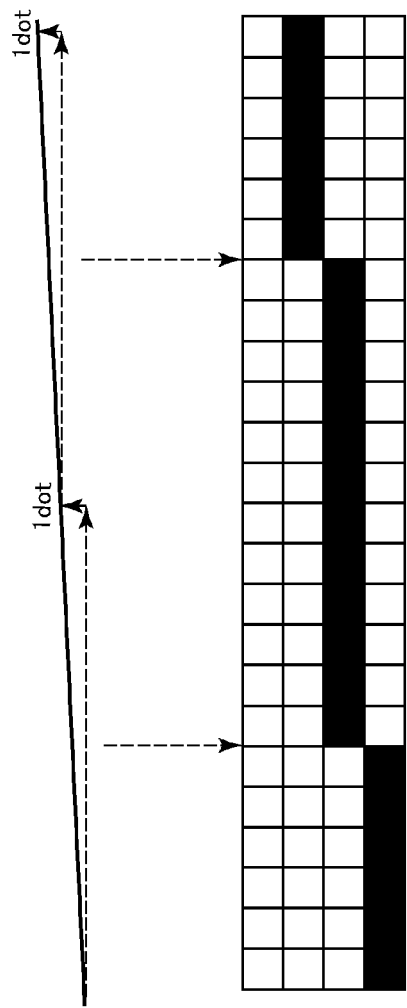
FIGS. 7A and 7B are diagrams showing a curved portion of the scanning line on an enlarged scale, which are useful in explaining a method of correcting the curving.

FIG. 7A is a diagram showing a portion of the curved scanning line on an enlarged scale. FIG. 7B shows how the DMA controller 305 outputs bitmap data to the printer section 107 while switching one line to be read out to another, when reading out the bitmap data from the image memory 304 in a manner adapted to the curving of the scanning line.

Figure 8:
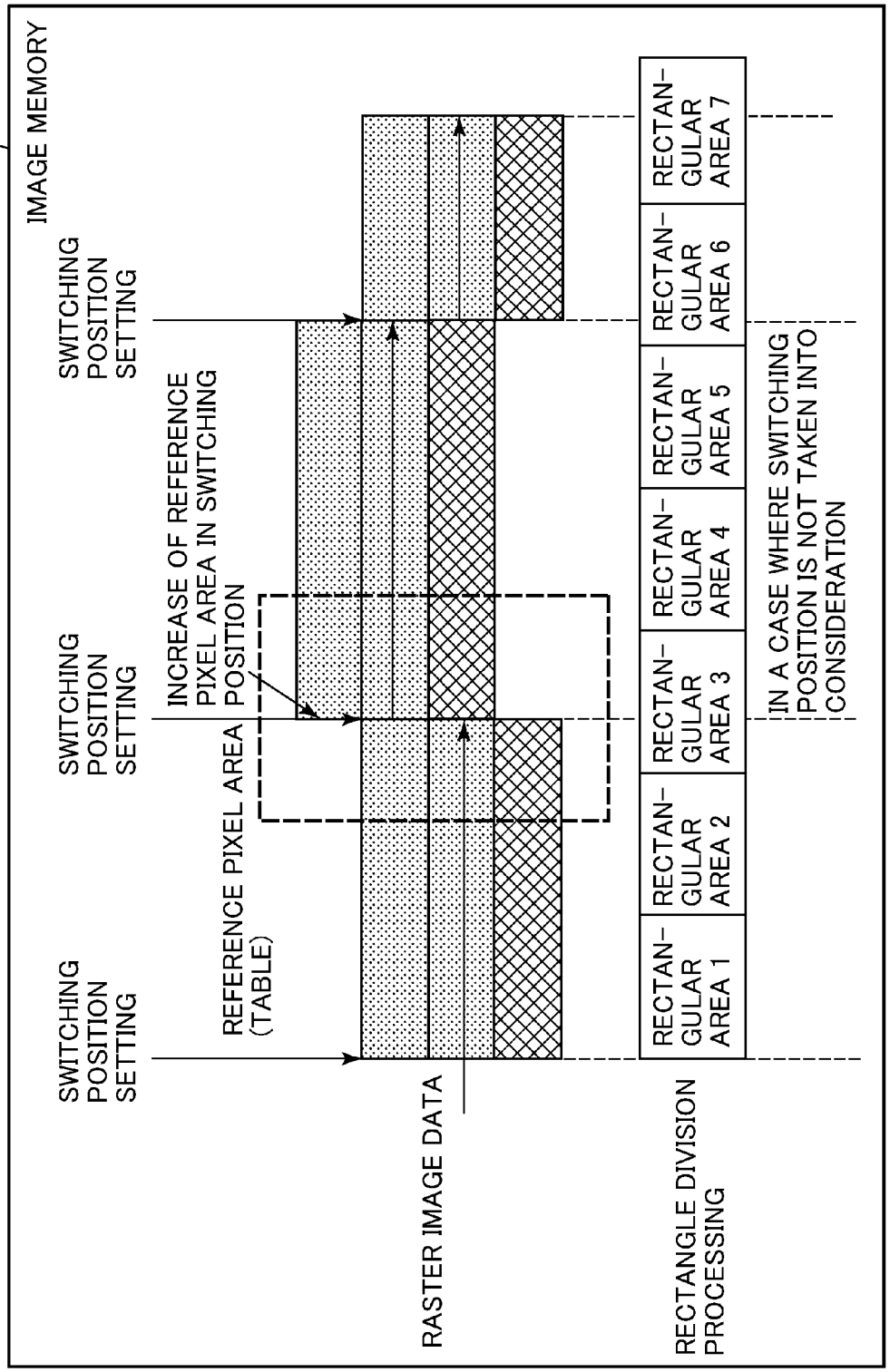
FIG. 8 is a diagram showing a case where each line-switching position is set within a rectangle area (differently from the first embodiment).

Next, the principles of dividing a rectangular area will be described with reference to FIGS. 4 and 8. FIG. 4 shows an example of the processing performed in the present embodiment, in which each line-switching position is made to coincide with a boundary position between split rectangular areas. FIG. 8 shows an example for comparison with FIG. 4, in which each line-switching position lies within a rectangular area.

As is apparent from comparison between FIG. 4 and FIG. 8, a considerable difference occurs in a reference pixel area needed for the same image processing, depending on whether image data is divided into rectangular areas in consideration of line switching as shown in FIG. 4 or without consideration of line switching as shown in FIG. 8. The reference pixel area is used for execution of image processing (filter processing and the like) which requires not only bitmap data of a rectangular area, but also bitmap data of pixels surrounding the rectangular area.

The difference between reference pixel areas is caused by a change in a range of reference pixels associated with each of remark pixels resulting from the switching of a line to be read out from the image memory 304 at a line-switching position. When line switching is not taken into consideration as shown in FIG. 8, the memory capacity required for an area (reference memory 1002) for storing reference pixels is different depending on the number of lines in the sub-scanning direction at the line-switching position set without consideration of line switching (the number is 1 in a case where data in a line one line above a current line is read, and 2 in a case where data in a line two lines above the current line is read).

On the other hand, when line switching is taken into consideration as shown in FIG. 4, the reference pixel area for storing necessary reference pixels can be set as a fixed one, without being dependent on the number of lines in the sub-scanning direction in the line-switching position. Consequently, when line switching is taken into consideration as shown in FIG. 4, the memory capacity required for the area (reference memory 1002) for storing reference pixels can be made smaller than in the case shown in FIG. 8.

The data processing section 101 receives rectangular image data (image data divided into rectangular areas) transferred in units of rectangular areas from the image memory 304 to the DMA controller 305 of the printer controller 103. The data processing section 101 also carries out image processing on each rectangular image data.

Figure 9:
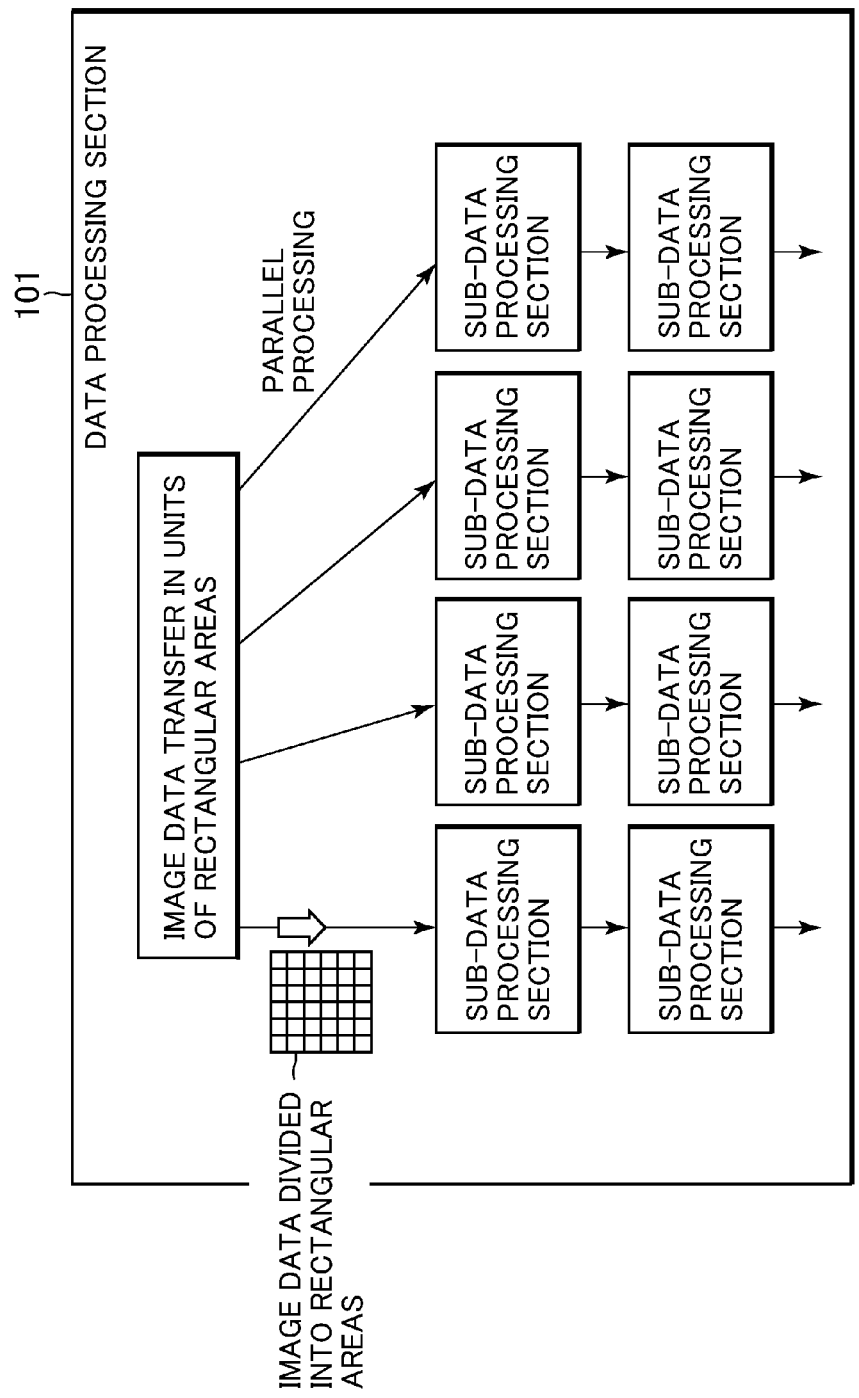
FIG. 9 is a diagram useful in explaining parallel processing carried out by sub-data processing sections in a data processing section.

FIG. 9 is a diagram useful in explaining how image processing is performed on image data in the data processing section 101. As shown in FIG. 9, rectangular image data blocks, i.e. divided rectangle areas are processed in parallel by the data processing section 101. More specifically, the data processing section 101 includes a plurality of sub-data processing sections (sub-data processing units) 1000 (see FIGS. 10 and 13), and the sub-data processing sections 1000 perform image processing on the respective rectangular image data blocks.

Each of the sub-data processing sections 1000 is capable of processing a rectangular image data block. The processing includes processing for sequentially calculating pixel values of the respective pixels of the image data, the processing using pixel values of pixels in reference pixel areas associated with each remark pixel. To this end, each of the sub-data processing sections 1000 is provided with the reference memory 1002 (see FIG. 13) for storing reference image data (pixel values).

Figure 10:
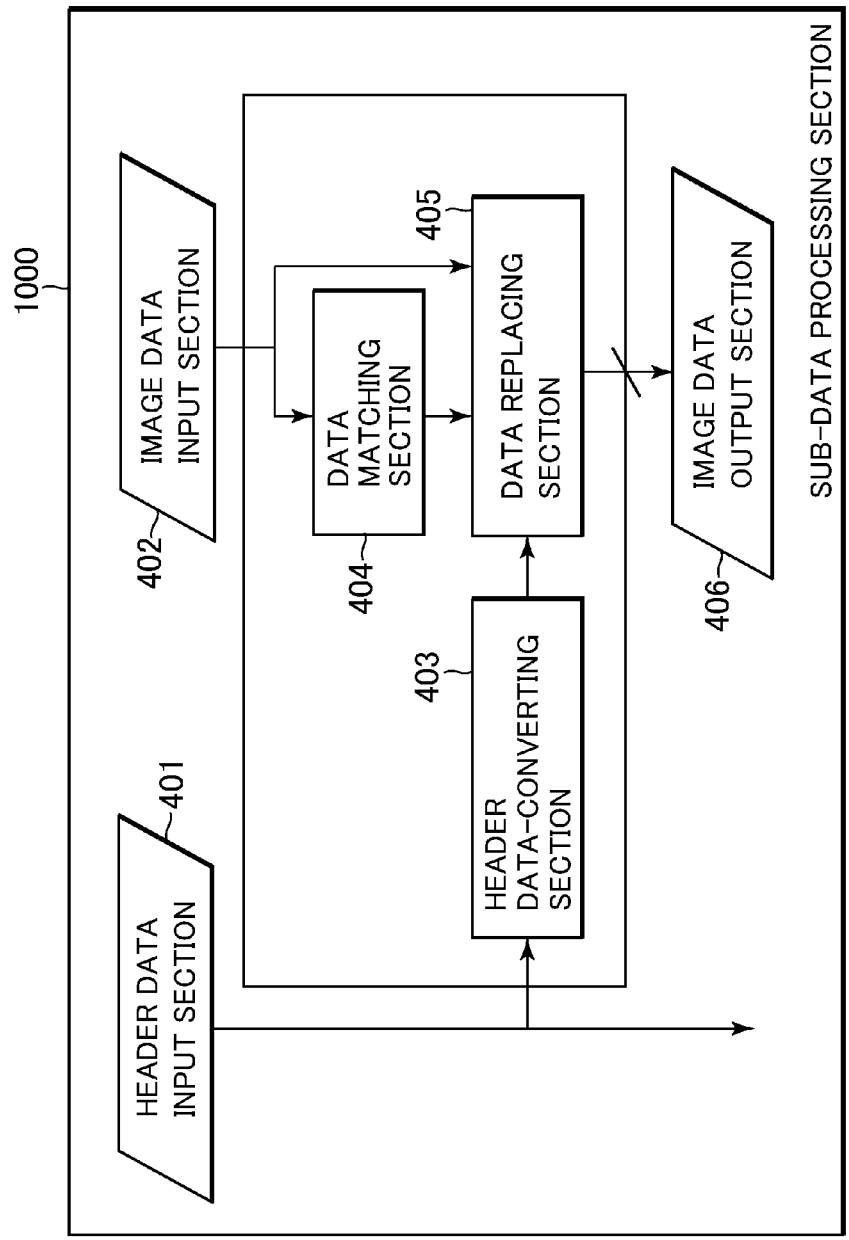
FIG. 10 is a block diagram of the sub-data processing section.

FIG. 10 shows an example of the configuration of each sub-data processing section 1000. The sub-data processing sections 1000 may be configured to perform the same image processing, or alternatively they 1000 may be configured to perform different image processing. As shown in FIG. 10, each sub-data processing section 1000 is comprised of a header data input section 401, an image data input section 402, a header data-converting section 403, a data matching section 404, a data replacing section 405, and an image data output section 406. The sub-data processing section 1000 is provided with blocks appearing in FIG. 13 in addition to the blocks appearing in FIG. 10.

Referring to FIG. 10, the header data input section 401 receives a set of a rectangular image data block and header data added to the rectangular image data block. The header data is decoded by the header data-converting section 403, and the rectangular image data block is processed by the data matching section 404 and the data replacing section 405.

As shown in FIG. 11, the data matching section 404 determines whether the values of respective pixels around a remark pixel are equal to "1" or "0" relative to the remark pixel. Then, the data matching section 404 calculates the sum of the relative values ("1" or "0") of the pixels around the remark pixel, and sends the sum data to the data replacing section 405. In FIG. 11, hatched areas around the remark pixel are assumed to have a relative value of 1, whereas non-hatched areas around the same are assumed to have a relative value of 0.

The data replacing section 405 converts the value of the remark pixel based on the decoded header data from the header data-converting section 403 and the sum data calculated by the data matching section 404, to thereby obtain the pixel value of an output image (remark pixel). For example, let it be assumed that the decoded header data designates pixel value conversion based on a value calculated by the data matching section 404 and that the average value of the calculated sums is equal to "0.5" (see a case of MK_AVE=0.5 in FIG. 11). In this case, the data replacing section 405 outputs a value of "1" as the value of the remark pixel. Also when the average of the calculated sums is equal to "1.0", the data replacing section 405 outputs "1" as the value of the remark pixel. On the other hand, when the average of the calculated sums is equal to "0", the data replacing section 405 outputs "0" as the value of the remark pixel. As described above, the data replacing section 405 outputs "0" as the value of the remark pixel when the average of the calculated sums is below "0.5", and outputs "1" when the average of the calculated sums is not smaller than "0.5". FIG. 11 exemplifies cases where the average of the calculated sums assumes the respective values of "0", "0.5", and "1.0", which are selected from various cases.

Next, a description will be given of image processing of a portion in a rectangular area at a line-switching position. In the case of processing a rectangular image data block adjacent to a line-switching position appearing in FIG. 12, the associated sub-data processing section 1000 performs the following processing: The sub-data processing section 1000 stores the pixel values of pixels in a reference pixel area around remark pixels in advance in the data matching section 404.

Figure 12:
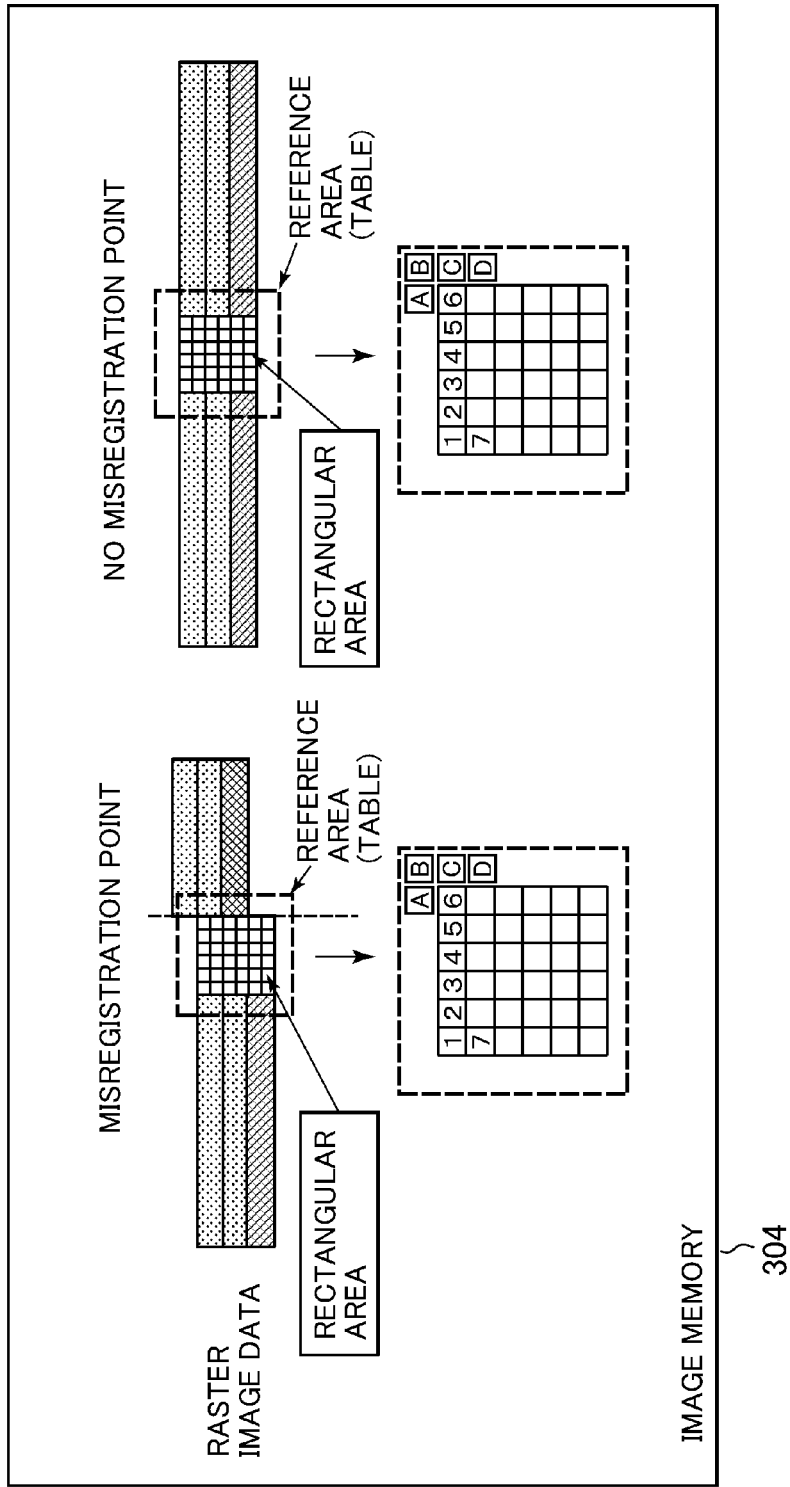
FIG. 12 is a diagram useful in explaining how reference pixels are processed in a rectangular area.

Then, assuming that the remark pixel is a pixel denoted by "6" in FIG. 12, the data matching section 404 calculates sum data for use in rewriting the data (pixel value) of the pixel "6", based on pixels "A", "B", "C", and "D" surrounding the pixel "6".

In other words, as shown in FIG. 12, in the case of processing a rectangular image data block adjacent to a line-switching position, the reference pixel area is formed to have the same size as in the case of processing a rectangular image data block which is not adjacent to a line-switching position. In short, each of the sub-data processing sections 1000 does not need to change the size of a reference area in consideration of a line-switching position, but only has to carry out image processing (pixel value correction) using only a reference area constantly having a fixed size.

Next, a description will be given of processing for determining a rectangular area width and image processing operation. The flow of a process including the processing for determining a rectangular area width is shown in a flowchart in FIG. 14.

Now, it is assumed that bitmap data is divided into rectangles having a predetermined fixed width. In a step S100, the register section 501 is initialized. A register for designating a line-switching position ("RSP") as a position on the bitmap data is provided in the register section 501 of the DMA controller 305. When a plurality of line-switching positions exist on one scanning line, all the line-switching positions are set in the register RSP in a step S101. For example, if there are ten line-switching positions on one scanning line, ten line-switching positions on bitmap data corresponding to the ten line-switching positions on the scanning line are set in the register RSP.

The register section 501 of the DMA controller 305 includes a register for line width ("RLW"), and the value of the width of image data corresponding to one scanning line of bitmap data to be processed, i.e. image data to be printed is set in the register RLW. In a step S102, this value is read out.

Then, in a step S103, whether or not to perform rectangle division processing for dividing the image data (bitmap data) into rectangular areas is determined. If the rectangle division processing is to be performed, in a step S104, the rectangular area-determining section 505 reads out the line-switching positions from the register RSP, and calculates a rectangular area width for use in dividing the bitmap data into a plurality of rectangular image data blocks, based on the read-out line-switching positions and the width of image data corresponding to one scanning line read out from the register RLW in the step S102.

In this case, the rectangular area width is calculated such that all the line-switching positions in the register RSP coincide with respective associated boundary positions between rectangular image data blocks, and the width of each rectangular image data block assumes a maximum value.

Preferably, the rectangular area width is set to a size not larger than the size of a rectangular image area that can be processed by the sub-data processing section 1000. Therefore, when the rectangular area width is larger than the size of a rectangular image area that can be processed by the sub-data processing section 1000, the sub-data processing section 1000 performs calculation for further dividing the rectangular area into blocks each having a rectangular area width that can be processed by the sub-data processing section 1000.

When the reference memory 1002 is provided, the sub-data processing section 1000 is further required to perform the rectangular area-dividing processing according to the capacity of the reference memory 1002 in consideration of a maximum image area width that can be handled in each data processing process.

Figure 13:
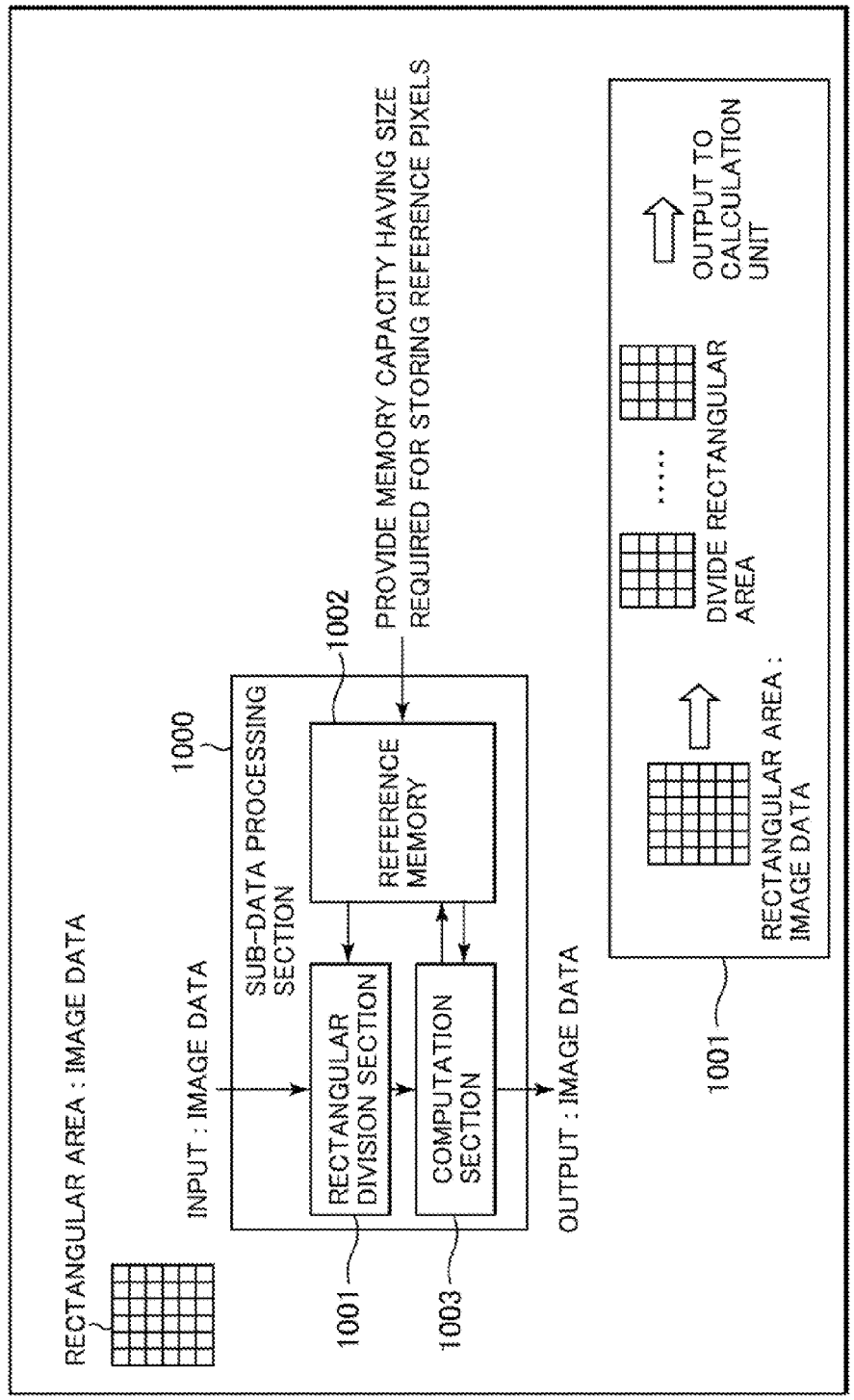
FIG. 13 is a diagram useful in explaining a processing method used in further dividing a rectangular area in the sub-data processing section.

FIG. 13 is a diagram useful in explaining a processing method used in further dividing a rectangular area in the sub-data processing section 1000. FIG. 13 shows a processing function performed in a case where the maximum image area width that can be handled by the reference memory 1002 provided in the sub-data processing section 1000 is smaller than the image width of an input rectangular area. In this case, a rectangular division section 1001 further divides the rectangular area image data input to the sub-data processing section 1000 according to the width of the reference memory 1002. In the step S104 in FIG. 14, a rectangular area width for further division is determined (calculated) as required. This computation is executed by a computation section 1003 in the sub-data processing section 1000 in FIG. 13.

Then, the process proceeds to a step S105, wherein the image data (bitmap data) is divided into rectangular blocks according to the determined rectangular area width. In a step S106, the divided image data is transferred as required. Preferably, a rectangular area is set as a unit for use in transfer processing executed by the DMA controller 305, and packet transfer is performed to thereby increase the speed of the transfer processing. In a step S107, a final divisional rectangular data block is transferred, and then it is determined whether or not there is next-page image data to be processed (S108). If there is next-page image data, the process returns to the step S103, whereas if not, the process is terminated.

According to the present embodiment, in performing image processing using reference pixels while correcting the curving of the scanning line, it is possible to carry out execute the image processing in units of rectangular image data blocks without increasing the capacity of the memory for storing image data corresponding to a reference pixel area.

The present invention is not limited to the above described embodiment. For example, according to other embodiments of the present invention, the processing (data transfer processing), which is executed by the DMA controller 305 in the above-described embodiment, is carried out using the CPU 308, a second CPU other than the CPU 308, a digital signal processor, or the like. Further, the present invention is also applicable to a color image forming apparatus of a type other than the tandem type, or a monochrome image forming apparatus.

Further, the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment. The program code embodied in the storage medium in which the program code is stored constitute another exemplary embodiment of the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished by causing an OS (operating system) or the like which operates on the computer to perform a part or all of the actual operations based on instructions of the program code.

Further, it is to be understood that the functions of the exemplary embodiments of the present invention may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to various exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-019056 filed Jan. 30, 2008, which is hereby incorporated by reference herein in its entirety.

What is claimed is:

1. An image forming apparatus comprising:
an image data storage unit configured to store image data;
an image forming unit configured to scan a photosensitive member with irradiation light based on the image data;
a positional information storage unit configured to store positional information indicative of positions in a direction of scanning for switching a line of image data to be read out from the image data storage unit so as to correct curving of a scanning line;
a determination unit configured to determine a rectangular area width based on the positional information stored in the positional information storage unit;
a dividing unit configured to divide the image data stored in the image data storage unit into a plurality of rectangular image data blocks according to the rectangular area width;
a transfer unit configured to transfer the plurality of rectangular image data blocks; and
an image processing unit configured to carry out image processing based on each of the plurality of rectangular image data blocks transferred by the transfer unit;
wherein the image forming unit is further configured to form an image based on each of the plurality of rectangular image data blocks subjected to image processing by the image processing unit.

2. The image forming apparatus according to claim 1, further comprising a designating unit configured to designate whether to switch a read line to an upper line or a lower line in each position indicated by the positional information, and
wherein the transfer unit switches a line to be read out from the image data storage unit to a line designated by the designating unit in the position indicated by the positional information.

3. The image forming apparatus according to claim 1, wherein the image processing unit includes a plurality of sub-processing units, and
wherein each of the sub-processing units carries out image processing based on each of the plurality of transferred rectangular image data blocks.

4. The image forming apparatus according to claim 3, wherein, when a width of image data that can be processed by the sub-processing unit is smaller than a width of a rectangular image data block, the sub-processing unit further divides the rectangular image data block into a plurality of rectangular image data blocks each having a width of image data that can be processed by the sub-processing unit, and carries out image processing in units of the further divided rectangular image data blocks.

5. The image forming apparatus according to claim 1, wherein the transfer unit is implemented by a DMA (Direct Memory Access) controller.

6. A control method for an image forming apparatus, the control method comprising:
storing image data;
forming an image by scanning a photosensitive member with irradiation light based on the image data; and
storing positional information indicative of positions in a direction of scanning for switching a line of the image data so as to correct curving of a scanning line;
determining a rectangular area width based on the positional information;
dividing the image data into a plurality of rectangular image data blocks according to the rectangular area width;
transferring the plurality of rectangular image data blocks;
carrying out image processing based on each of the plurality of transferred rectangular image data blocks; and
forming an image based on each of the plurality of rectangular image data blocks subjected to image processing.

7. The control method according to claim 6, further comprising:
designating whether to switch a line of the image data to an upper line or a lower line in each position indicated by the positional information; and
switching a line of the image data to a line designated by the designating in the position indicated by the positional information.

8. The control method according to claim 6, wherein carrying out image processing includes performing a plurality of sub-processes, and
wherein each of the plurality of sub-processes carries out image processing based on each of the plurality of transferred rectangular image data blocks.

9. The control method according to claim 8, wherein, when a width of image data that can be processed by a sub-process of the plurality of sub-processes is smaller than a width of a rectangular image data block, performing the sub-process includes further dividing the rectangular image data block into a plurality of rectangular image data blocks each having a width of image data that can be processed by the the sub-process and carrying out image processing in units of the further divided rectangular image data blocks.

10. The control method according to claim 6, wherein the determining and dividing is implemented by a DMA (Direct Memory Access) controller.

11. A non-transitory computer readable storage medium that stores a program comprising instructions capable of causing a computer to perform a control method for an image forming apparatus, the control method comprising:
storing image data
scanning a photosensitive member with irradiation light based on the image data;
storing positional information indicative of positions in a direction of scanning for switching a line of image data so as to correct curving of a scanning line;
determining a rectangular area width based on the positional information;
dividing the image data into a plurality of rectangular image data blocks according to the rectangular area width;
transferring the plurality of rectangular image data blocks;
carrying out image processing based on each of the plurality of transferred rectangular image data blocks; and
forming an image based on each of the plurality of rectangular image data blocks subjected to image processing.

* * * * *